R. KUNZ.
HEARTH OF BLAST FURNACES.
APPLICATION FILED NOV. 30, 1912.

1,236,721.

Patented Aug. 14, 1917.

Witnesses:
G. Lowe
F. Hogg

Inventor:
Rudolf Kunz
by Gowen & Gowen
Attorneys.

UNITED STATES PATENT OFFICE.

RUDOLF KUNZ, OF GEORGSMARIENHÜTTE, NEAR OSNABRÜCK, GERMANY.

HEARTH OF BLAST-FURNACES.

1,236,721.   Specification of Letters Patent.   Patented Aug. 14, 1917.

Application filed November 30, 1912. Serial No. 734,311.

*To all whom it may concern:*

Be it known that I, RUDOLF KUNZ, a citizen of the German Empire, and residing at Georgsmarienhütte, near Osnabrück, Germany, have invented certain new and useful Improvements in Hearths of Blast-Furnaces, of which the following is a specification.

My invention relates to the hearths or other portions of blast furnaces.

In working blast furnaces serious disturbances and accidents are frequently caused by the liquid iron breaking through the wall of the hearth. The breaking out of the pig-iron readily leads to serious accidents particularly when the outflowing iron comes into contact with inclosed water or a heap of moist material.

It has heretofore been attempted to prevent these outbreaks as much as possible by covering the hearth outside with a thick wall of fireproof bricks of various compositions, combined with simple or multiple armoring of the hearth, but complete success could not be obtained in this way because none of the so-called fireproof materials were able to withstand the high temperatures and the chemical actions to which they were subjected. Double-walled iron furnaces have proved just as little successful. In the case of a breaking out of the iron, the water inclosed by the walls gives rise to violent explosions.

According to my invention the hearth is formed of a solid iron wall and is water cooled on the outside. In consequence of the good conductivity of the iron the action of the cooling water can penetrate the walls of the hearth so that these are preserved from destruction, especially as iron is influenced but little by the chemical action of slag. Preferably the outside face of the hearth is made slanting so that it increases downward in diameter, and I provide it with vertical ribs or corrugations for the purpose of uniform flow of the water and surround it at the bottom with a channel which is preferably located below the floor. In this manner the pressure of the pig-iron on the wall is diminished and a good action of the cooling water caused to flow over said wall is assured.

The cooling can be made so severe that a layer of pig-iron is formed at the inside wall of the hearth. Such a layer will be produced, for example, by intense cooling, while the blast is shut off, when a diminution of the thickness of the wall is feared.

One illustrative embodiment of my invention is represented by way of example in the accompanying drawing, in which—

Figure 1:
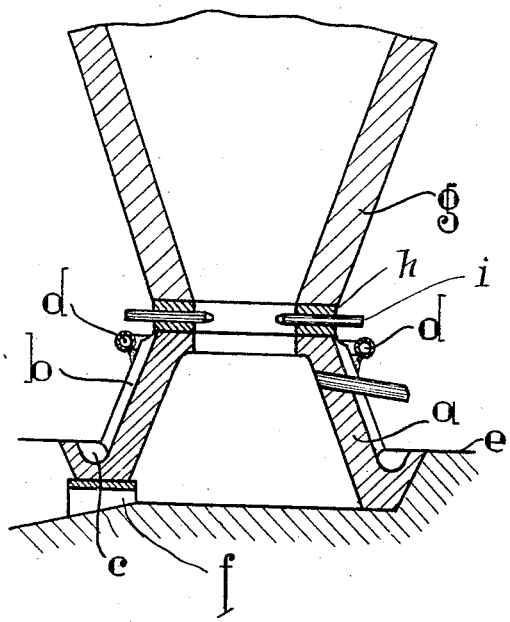
Figure 2:
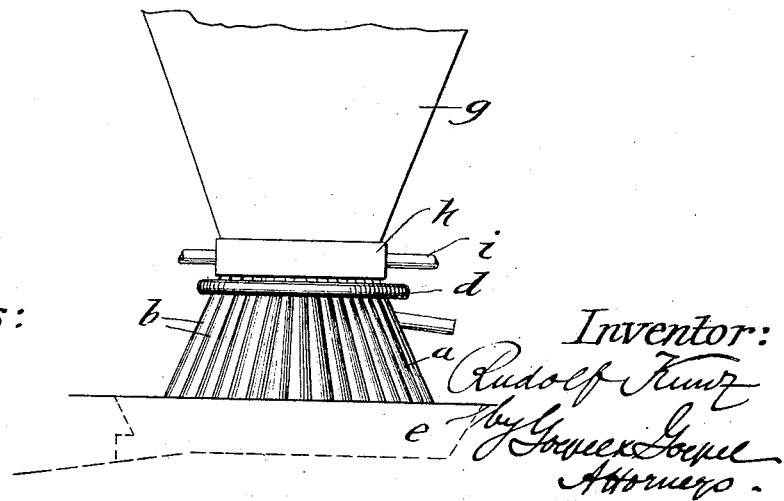

Figure 1 is a vertical sectional view, and Fig. 2 is a side elevational view thereof.

Referring to the drawing, the iron hearth $a$ is provided with ribs $b$ and a channel $c$ located under the floor $e$. Water is constantly supplied by the pipe $d$ to the hearth. The tap-hole is here designated $f$ and the bosh $g$.

The operation of my improved hearth is as follows:

While the furnace is in operation, the walls of the hearth $a$ are kept cool, by means of a stream of water from the pipe $d$. This water flows down evenly by means of the ribs $b$, and the inclination of the walls of $a$, to the channel $c$, located under the floor $e$. As the iron walls of the hearth are good conductors, the cooling effect easily penetrates them. As the water flows down the walls of the hearth $a$ in thin layers, any explosions caused by the breaking out of the iron is minimized. This is further achieved by the channel $c$, which leads the water away. If the walls of the hearth $a$ become weakened, the cooling can be made so severe, while the blast is shut off, that an internal layer of iron will be formed on the walls. At the narrow intermediate portion $b$, blast nozzles $i$ are arranged which inject a blast under pressure.

I claim:

1. In a blast furnace, a one-piece hearth comprising an integral iron wall and forming the sole lateral envelop of the molten metal in the hearth, means at the upper portion of the hearth for supplying cooling water in a thin sheet externally of its wall, and a channel in the base of the hearth wall entirely surrounding the hearth to conduct off the waste cooling water.

2. In a blast furnace, a one-piece hearth comprising an integral iron wall, sloping downwardly and outwardly from the twyers, and forming the sole lateral envelop of the molten metal in the hearth, means at the upper portion of the hearth for supplying cooling water in a thin sheet externally of its wall, and a channel in the base of the hearth wall entirely surrounding the hearth to conduct off the waste cooling water.

3. In combination, a blast furnace one-piece hearth having walls made of iron, said walls being outwardly inclined toward the bottom, and having external longitudinal ribs, of a water pipe for supplying an external cooling stream of water at the upper part thereof, and a channel at the lower part thereof, for leading away the water.

In testimony, that I claim the foregoing as my invention, I have signed my name in presence of two subscribing witnesses.

RUDOLF KUNZ.

Witnesses:
FREDERICK HOYERMANN,
MAGDALENA KUNZ.

Copies of this patent may be obtained for five cents each, by addressing the "Commissioner of Patents, Washington, D. C."